(12) United States Patent
Collins et al.

(10) Patent No.: US 11,964,589 B2
(45) Date of Patent: Apr. 23, 2024

(54) ELECTRIFIED VEHICLE WITH DUAL-USE STORAGE/COOLING COMPARTMENT

(71) Applicant: FORD GLOBAL TECHNOLOGIES, LLC, Dearborn, MI (US)

(72) Inventors: Patrick Gordon Collins, Canton, MI (US); David Michael Horan, Northville, MI (US); Thomas Karl Rothermel, Waterford, MI (US); Jacob Gregory Powers, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 17/523,357

(22) Filed: Nov. 10, 2021

(65) Prior Publication Data

US 2023/0145131 A1 May 11, 2023

(51) Int. Cl.
*B61D 27/00* (2006.01)
*B60H 1/00* (2006.01)
*B60H 1/32* (2006.01)
*B60L 58/26* (2019.01)
*B62D 25/08* (2006.01)

(52) U.S. Cl.
CPC .......... *B60L 58/26* (2019.02); *B60H 1/00278* (2013.01); *B60H 1/3235* (2013.01); *B62D 25/087* (2013.01); *B60H 2001/00307* (2013.01); *B60H 2001/3289* (2013.01); *B60L 2240/425* (2013.01); *B60L 2240/545* (2013.01); *B60L 2250/12* (2013.01)

(58) Field of Classification Search
CPC ............... B60L 58/26; B60L 2240/425; B60L 2240/545; B60L 2250/12; B60H 1/00278; B60H 1/3235; B60H 2001/00307; B60H 2001/3289; B62D 25/087
USPC .......................................................... 165/42
See application file for complete search history.

(56) References Cited

U.S. PATENT DOCUMENTS

| 10,315,499 | B2 | 6/2019 | Zhu et al. | |
| 2012/0168111 | A1* | 7/2012 | Soukhojak | ............ F28D 15/043 165/10 |
| 2019/0118692 | A1 | 4/2019 | Qiu et al. | |

FOREIGN PATENT DOCUMENTS

GB          2457806 A      9/2009

* cited by examiner

*Primary Examiner* — Davis D Hwu
(74) *Attorney, Agent, or Firm* — Brooks Kushman PC; David B. Kelly

(57) ABSTRACT

An electrified vehicle includes a storage compartment positioned forward of a vehicle passenger cabin and accessible by opening a vehicle hood, a thermally conductive plate or heat exchanger in contact with a bottom surface of the storage compartment and having an associated conduit configured for circulating a working fluid from a vehicle cooling system, and a valve operable to control flow of the working fluid through the conduit. The storage compartment may be filled with a cooling medium, such as ice or dry ice, to provide enhanced cooling during high-demand operation or charging of the vehicle, such as when operating in a performance/track mode, towing a trailer, or in other extreme use scenarios. The valve may be controlled so that the working fluid bypasses the conduit when the storage compartment is used for cargo and/or enhanced cooling is not desired.

13 Claims, 3 Drawing Sheets

ELECTRIFIED VEHICLE WITH DUAL-USE STORAGE/COOLING COMPARTMENT

TECHNICAL FIELD

This disclosure generally relates to an electrified vehicle having one or more dual-use compartments to provide additional vehicle component cooling using a cooling medium disposed in the compartment(s), such as a front trunk (frunk), rear trunk, or similar compartment.

BACKGROUND

Electrified vehicles may provide additional storage or cargo space that would otherwise be occupied by the engine of a conventional vehicle. Electrified vehicles that were originally developed and marketed for range and functionality are increasingly being recognized for performance characteristics competitive with engine-based high-performance vehicles. Performance applications of electrified vehicle powertrains may have significant cooling demands to meet customer expected performance during on-track or closed course events, as well as during vehicle charging.

SUMMARY

In some configurations, an electrified vehicle includes an electric machine configured to provide torque to vehicle wheels, an energy store coupled to the electric machine by associated power electronics, a vehicle body defining a cargo compartment configurable to contain a cooling medium, a heat exchanger disposed immediately below the cargo compartment and configured to selectively exchange heat with the cargo compartment, a cooling system configured to circulate a working fluid to exchange heat with at least one of the electric machine, the power electronics, and the energy store, and a valve operable to selectively route the working fluid of the cooling system through the heat exchanger or to bypass the heat exchanger. The energy store may be implemented by a high-voltage traction battery, or a hydrogen fuel cell, for example. The cooling medium may comprise water, ice, or dry ice ($CO_2$), for example. The vehicle may include a controller in communication with the valve and programmed to operate the valve in response to receiving user input requesting enhanced cooling.

In one or more embodiments, the electrified vehicle may include a human-machine interface (HMI) configured to activate a performance mode in response to operator input, wherein the controller controls the valve to route the working fluid through the heat exchanger when operating in the performance mode. The controller may be further programmed to control the valve to route the working fluid through the heat exchanger in response to charging of the energy store from an external power source. The controller may be further programmed to control the valve in response to temperature of at least one of the heat exchanger, the energy store, the electric machine, and the power electronics. The cargo compartment may comprise a water-tight cargo compartment accessible by opening a hood of the vehicle. The hood of the vehicle may include an associated or integrated lid for the cargo compartment that provides a water-tight seal for the cargo compartment when the hood is closed. The cargo compartment may include a plurality of baffles, which may be removable. The heat exchanger may comprise a cold plate forming a bottom surface of the cargo compartment.

Embodiments may also include a method for controlling an electrified vehicle having a cooling system configured to circulate a working fluid to cool at least one of an electric machine, a traction battery, and power electronics, the vehicle including a cargo compartment configurable to contain a cooling medium and having a heat exchanger in contact with the cargo compartment. The method may include, by a controller, controlling a valve to route the working fluid through the heat exchanger to transfer heat from the working fluid to the cooling medium in response to a request for increased cooling, and controlling the valve to route the working fluid to bypass the heat exchanger otherwise. The method may include receiving input from a human-machine interface to activate a performance mode and generating the request for increased cooling in response to activation of the performance mode. The method may include generating the request for increased cooling in response to connecting an external power source to charge the traction battery. The method may include generating the request for increased cooling in response to temperature of the working fluid exceeding a corresponding temperature threshold.

In various embodiments, a vehicle includes a storage compartment positioned forward of a vehicle passenger cabin accessible by opening a vehicle hood, a thermally conductive plate in contact with a bottom surface of the storage compartment and having an associated conduit configured for circulating a working fluid from a vehicle cooling system, and a valve operable to control flow of the working fluid through the conduit. The vehicle hood may include an integrated lid that cooperates with the storage compartment to provide a water-tight seal. The vehicle may include a controller in communication with the valve, the controller programmed to operate the valve to route the working fluid through the conduit in response to input from a human-machine interface. The storage compartment may comprise a water-tight compartment configured to contain ice. The vehicle may also include an electric machine coupled to a traction battery by power electronics, wherein the working fluid circulates through the cooling system and the conduit to cool at least one of the traction battery, the electric machine, and the power electronics.

One or more embodiments according to the disclosure may provide associated advantages. For example, electrified vehicles often include additional storage space beneath the hood in a front trunk or frunk that may be used to provide incrementally enhanced cooling by adding a cooling medium such as ice, dry ice, or similar substance. When not being used to provide enhanced cooling, the storage compartment may be used for cargo. Enhanced cooling performance can be provided while driving as well as during charging normal or fast charging of a traction battery from an external power source. Additionally, the system can be used to provide enhanced cabin cooling during longer trips to reduce climate system demands of the electronic air conditioning compressor, or for high-demand use scenarios such as performance driving on a track or closed course, towing a trailer, excessive ambient temperatures, mountain terrain, etc. Incremental cooling according to one or more embodiments is applicable to any powertrain cooling system in a single loop or parallel, oil-to-liquid coolers, air-to-liquid coolers, or a water jacket of electric machines, for example.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
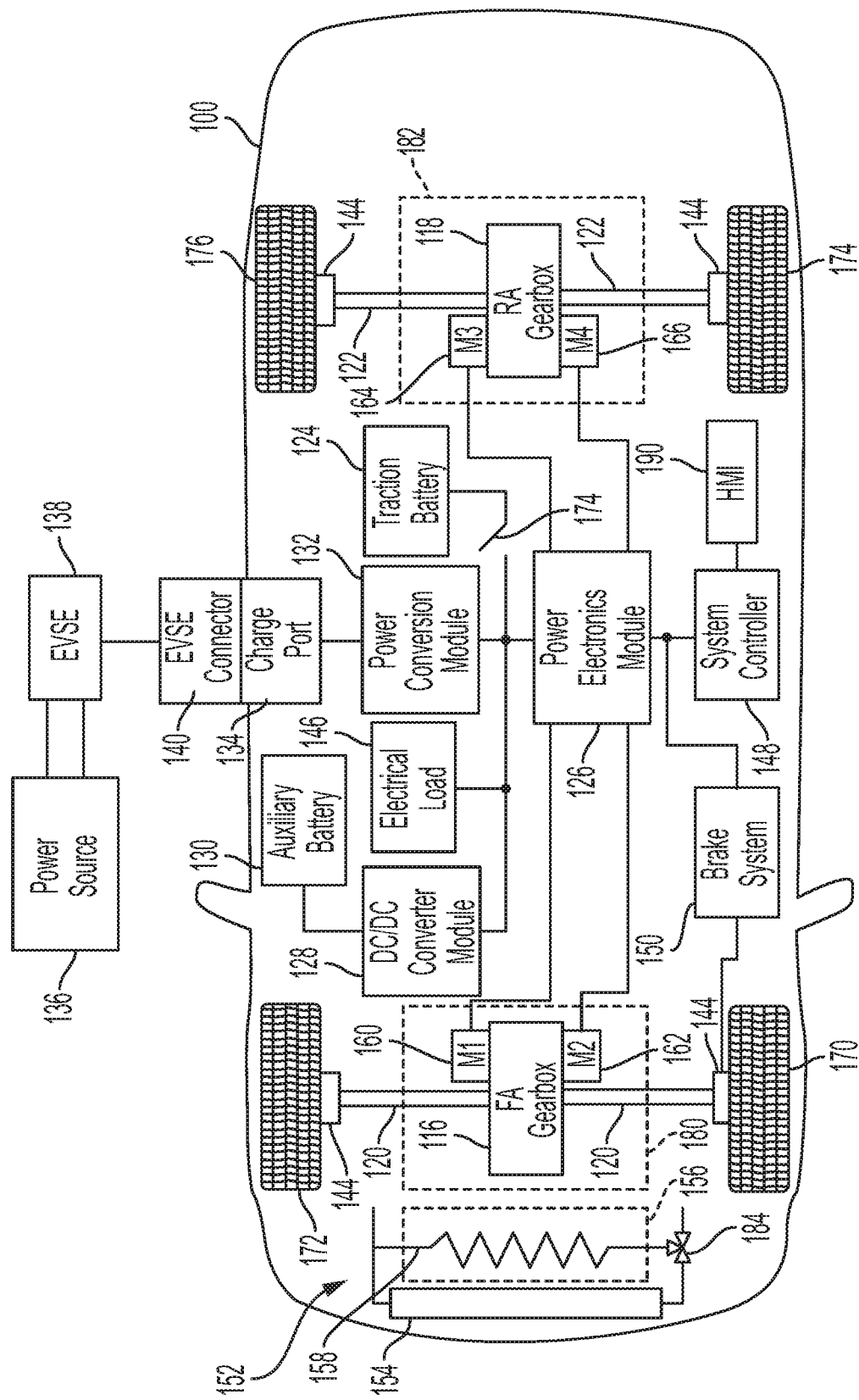
FIG. 1 is a block diagram of a representative electrified vehicle having at least one storage compartment configured to contain a cooling medium with a heat exchanger and associated valve to enhance powertrain and/or cabin cooling.

FIG. 1 depicts a representative configuration for an electrified vehicle implemented as a battery-electric vehicle (BEV). A BEV 100 may comprise one or more electric machines mechanically coupled to one or more gearboxes to achieve a variety of driving configurations. One or more electric machines coupled to a gearbox may be referred to as a drive unit. A first drive unit 180 may include a first front-axle electric machine 160 and a second front-axle electric machine 162 coupled to a front-axle gearbox 116. The front-axle gearbox 116 may include one or more gears that combine the torque from the first front-axle electric machine 160 and the second front-axle electric machine 162 to provide a torque output to a differential portion of the front-axle gearbox 116. The differential portion of the front-axle gearbox 116 may be mechanically coupled to front drive shafts 120 and direct a portion of the torque to a left-side front wheel 170 and a right-side front wheel 172. In other embodiments, a single electric machine may be coupled to a front-axle gearbox to selectively provide driving torque to the associated front wheels 170, 172.

A second drive unit 182 may include a first rear-axle electric machine 164 and a second rear-axle electric machine 166 coupled to a rear-axle gearbox 118. The rear-axle gearbox 118 may include one or more gears that combine the torque from the first rear-axle electric machine 164 and the second rear-axle electric machine 166 to provide a torque output to a differential portion of the rear-axle gearbox 118. The differential portion of the rear-axle gearbox 118 may be mechanically coupled to rear drive shafts 122 and direct a portion of the torque to a left-side rear wheel 174 and a right-side rear wheel 176. In various embodiments, a single electric machine may be coupled to a rear-axle gearbox to selectively provide driving torque to the associated rear wheels 174, 176. In some configurations, the electric machines 160, 162, 164, 166 may be integrated into or near the wheel assemblies.

The electric machines 160, 162, 164, 166 may be capable of operating as a motor or a generator. The electric machines 160, 162, 164, 166 can provide a propulsion or driving torque as well as a regenerative braking, or holding torque capability. The electric machines 160, 162, 164, 166 may act as generators to recover energy that would normally be lost as heat in a friction braking system including friction brakes 144.

An electrical energy store may be implemented by a traction battery or battery pack 124 that stores energy that can be used by the electric machines 160, 162, 164, 166. Some applications may include an energy store implemented by a fuel cell or similar device. The traction battery 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 may also be electrically coupled to the electric machines 160, 162, 164, 166 and provides the ability to bi-directionally transfer energy between the traction battery 124 and the electric machines 160, 162, 164, 166. For example, a traction battery 124 may provide a DC voltage while the electric machines 160, 162, 164, 166 may operate with a three-phase alternating current (AC) to function. The power electronics module 126 may convert the DC voltage to a three-phase AC waveform to operate the electric machines 160, 162, 164, 166. In a regenerative mode, the power electronics module 126 may convert the three-phase AC waveform from the electric machines 160, 162, 164, 166 acting as generators to a DC voltage level that is compatible with the traction battery 124.

In addition to providing energy for propulsion, the traction battery 124 may provide energy for other vehicle electrical systems. The vehicle 100 may include a DC/DC converter module 128 that converts the high-voltage DC output of the traction battery 124 to a low-voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. One or more electrical loads 146 may be coupled to the high-voltage bus. The electrical loads 146 may have an associated controller that operates and controls the electrical loads 146 when appropriate. Examples of electrical loads 146 may be a heating module or an air-conditioning module.

The traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 100. The external power source 136 may provide DC or AC electric power to the EVSE 138. The EVSE 138 may have a charge connector 140 for plugging into a charge port 134 of the vehicle 100. The charge port 134 may be any type of port configured to transfer power from the EVSE 138 to the vehicle 100. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 100. The EVSE connector 140 may have pins that mate with corresponding recesses of the charge port 134. Alternatively, various components described as being electrically coupled or connected may transfer power using a wireless inductive coupling. An electric energy store may alternatively be implemented by a fuel cell or similar device that converts stored energy into electrical energy.

An electronically controlled braking system 150 includes one or more wheel brakes 144 coupled to the wheels 170, 172, 174, 176 to provide a friction braking torque for the vehicle 100 and preventing motion of the vehicle 100. Braking or holding torque may also be provided by one or more of the electric machines 160, 162, 164, and 166. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144. The brake system 150 may respond to driver commands and may also operate autonomously to implement features such as stability control. The controller of the brake system 150 may implement a method of applying a requested brake force when requested by another controller or sub-function.

Electronic modules, controllers, and/or processors in the vehicle 100 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules or controllers and associated actuators and sensors and may include power signals from the auxiliary battery 130. Different signals may be transferred over different channels of the vehicle network. For example, video signals may be transferred over a high-speed channel (e.g., Ethernet) while control signals may be transferred over CAN or dedicated connections. The vehicle network may include any hardware and software components that aid in transferring signals and data between modules. The vehicle network is not shown in FIG. 1 but it may be implied that the vehicle network may connect to any electronic module, controller, or processor that is present in the vehicle 100. Likewise various sensors and actuators may be directly connected to a controller or control module and/or may transmit or receive signals over the vehicle network directly or through an associated controller or module. A vehicle system controller (VSC) 148 may be present to coordinate the operation of the various components including other modules, controllers, and processors.

Although a BEV is depicted, other electrified vehicle technologies and hybrid technologies are possible. For example, the vehicle may be a fuel cell vehicle. The fuel cell vehicle may include a fuel cell as a primary energy source while the traction battery 124 acts as a secondary energy source. The fuel cell vehicle may be a plug-in type that permits recharging of the traction battery 124. The vehicle may be a hybrid vehicle that includes an engine and an electric drive capability. The implementations described herein may be applicable to any vehicles that include an electric drive having one or more electric machines that may be controlled to provide driving torque to a single axle at a time.

In some configurations, the electric machines 160, 162, 164, 166 may each be configured to provide propulsion torque to drive wheels of the vehicle 100. Various combinations of the electric machines 160, 162, 164, 166 are possible. Configurations may be implemented having from one to four electric machines.

For example, the vehicle 100 may be configured to be a rear-wheel drive (RWD) vehicle in which an electric drive unit is coupled to a rear axle of the vehicle. The RWD vehicle may include only the first rear-axle electric machine 164. In some configurations, the RWD vehicle may include the first rear-axle electric machine 164 and the second rear-axle electric machine 166. In the RWD vehicle, the first front-axle electric machine 160, the second front-axle electric machine 162, and the front-axle gearbox 116 may be omitted.

As another example, the vehicle 100 may be configured as a front-wheel drive (FWD) vehicle in which a drivetrain is coupled to a front axle of the vehicle. The FWD vehicle may include only the first front-axle electric machine 160. In some configurations, the FWD vehicle may include the first front-axle electric machine 160 and the second front-axle electric machine 162. In the FWD vehicle, the first rear-axle electric machine 164, the second rear-axle electric machine 166, and the rear-axle gearbox 118 may be omitted.

The vehicle 100 depicted in FIG. 1 may be implemented as an all-wheel drive (AWD) vehicle. In some configurations, the second front-axle electric machine 162 may be omitted (e.g, one electric machine on the front axle and two electric machines on the rear axle). In some configurations, the second rear-axle electric machine 166 may be absent (e.g, one electric machine on the rear axle and two electric machines on the front axle). In some configurations, the second front-axle electric machine 162 and the second rear-axle electric machine 166 may be absent (e.g., only one electric machine per axle). The particular configuration may be selected for desired performance and handling characteristics of the vehicle.

Vehicle 100 may include a human-machine interface (HMI) 190 in communication with system controller 148. HMI 190 may receive operator input to select or activate a track mode, performance mode, or other mode that is associated with an enhanced cooling request that may automatically control one or more components of the cooling system, such as a pump or electronically controlled valve. HMI 190 may also display various information, suggestions, instructions, alerts, and/or options for a vehicle occupant related to activation of an enhanced cooling mode, addition of a cooling medium for enhance cooling, operation of related controls, etc.

A cooling system 152 includes a heat exchanger or radiator 154 provides a fluid-to-air heat exchange from a coolant or working fluid circulated by a corresponding coolant pump (not shown) through one or more cooling loops to provide cooling to the passenger cabin and/or various vehicle components including electric machines 160, 162, 164, 166, power electronics module 126, and traction battery 124. Various cooling loops may be separated with fluid flow controlled by one or more electronically controlled or thermostatically controlled valves to share a common working fluid. Alternatively, separate cooling loops may be coupled by oil-to-fluid, air-to-fluid, or fluid-to-fluid heat exchangers and may include various other types of conventional cooling system components depending on the particular application and implementation. Representative working fluids include water, water/glycol mixture, refrigerant, etc.

Vehicle 100 includes a cargo or storage compartment 156 (best illustrated in FIGS. 2A, 2B) positioned forward of a vehicle passenger cabin in a front trunk (frunk). A heat exchanger 158 is positioned beneath the bottom of storage compartment 156 and may be implemented by a thermally conductive cold plate having associated cooling coils or serpentine conduits configured to facilitate heat rejection from circulating working fluid when an associated valve 184 is positioned to route the working fluid through heat exchanger 182. A cold plate may function as the bottom of storage compartment 156, or may be in contact with the bottom of compartment 156 depending on the particular implementation. Similarly, heat exchanger 158 may comprise cooling coils positioned within the storage compartment 156 along the bottom surface, or outside the storage compartment 156 in contact with the bottom surface without using a cold plate. To provide dual-use functionality of compartment 156 for either enhanced cooling or cargo storage, the positioning and sizing of the additional cooling hardware should consider any potential reduction of the storage space and human factors for switching between uses. When used for enhanced cooling, compartment 156 may contain a cooling medium, such as ice, dry ice (frozen $CO_2$), water, or any other solid, liquid, or multi-phase cooling medium to absorb heat from the working fluid of the cooling system passing through heat exchanger 158.

Valve 184 may also be positioned such that the circulating working fluid bypasses heat exchanger 158, such as when compartment 156 is being used for cargo storage, for example. Valve 184 may be an electronically controlled valve controlled directly or indirectly by an associated controller, such as system controller 148, in response to an associated signal from a sensor or input device, such as HMI 190. Alternatively, valve 184 may be manually controlled in some embodiments.

Figure 2A:
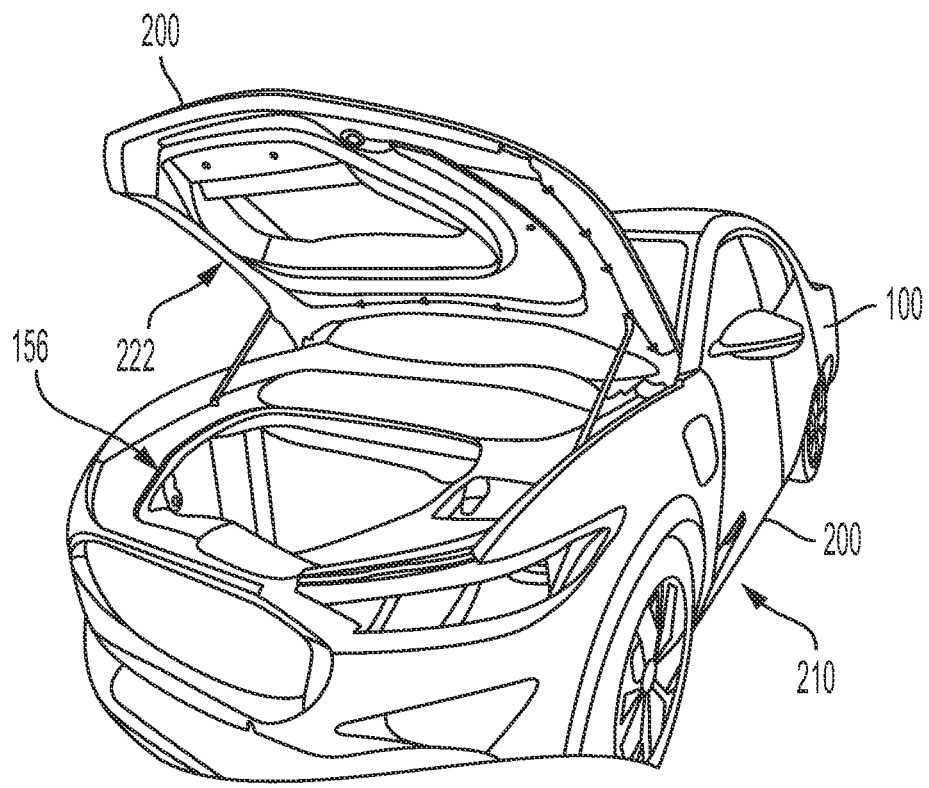
FIGS. 2A and 2B illustrate a representative electrified vehicle having a storage or cargo compartment disposed within a front trunk (frunk) configured to contain a cooling medium.
Figure 2B:
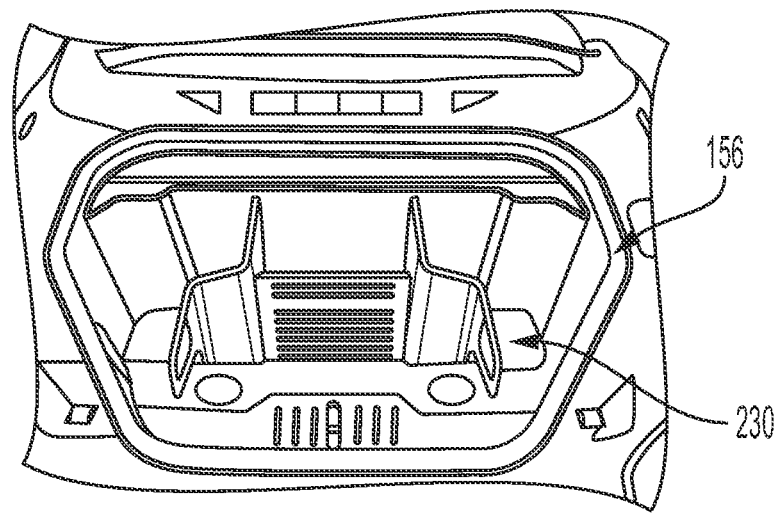

FIGS. 2A and 2B illustrate a representative compartment configurable as a storage compartment or to contain a cooling medium for operation in an enhanced cooling or performance mode. Referring now to FIGS. 1, 2A, and 2B, vehicle 100 is an electrified vehicle having a vehicle body 200 defining a compartment 156 positioned forward of a passenger cabin 210 and configurable to contain a cooling medium. As shown in FIGS. 2A and 2B, compartment 156 may be disposed in a front trunk (frunk) of vehicle 100 accessible beneath vehicle hood 220, which may include an integrated lid 222 for compartment 156 that forms a water-tight seal for compartment 156 when hood 220 is closed. In other embodiments, a separate lid may be provided that is detached from hood 220. Those of ordinary skill in the art will recognize that vehicle 100 may include a cargo/storage compartment or additional compartments in a rear trunk, below a load panel in a hatchback vehicle, or similar locations that may also be equipped similarly to compartment 156 to provide enhanced cooling to the vehicle cooling system when filled with a cooling medium. The location and number of such storage compartments may vary depending on the particular vehicle configuration and intended application or use.

In one or more embodiments, compartment 156 may include a cargo organizer or divider 230 that may also function as a baffle or baffles when filled with a cooling medium to inhibit movement and associated noise and weight shifting of the cooling medium during vehicle operation. Alternatively, divider 230 may be removable or replaceable with special-purpose baffles designed for particular types of cooling media, such as liquid or solid media, for example. Compartment 156 may be a water-tight compartment (when closed) having a drain and associated plug to facilitate removal of a liquid cooling medium. As previously described, compartment 156 may include heat exchanger coils within the compartment, a cold plate that functions as a bottom surface of the compartment, or similar heat exchanger 158 disposed immediately below the compartment 156 configured to exchange heat with a cooling medium within compartment 156 and a working fluid of the cooling system 152.

Figure 3:
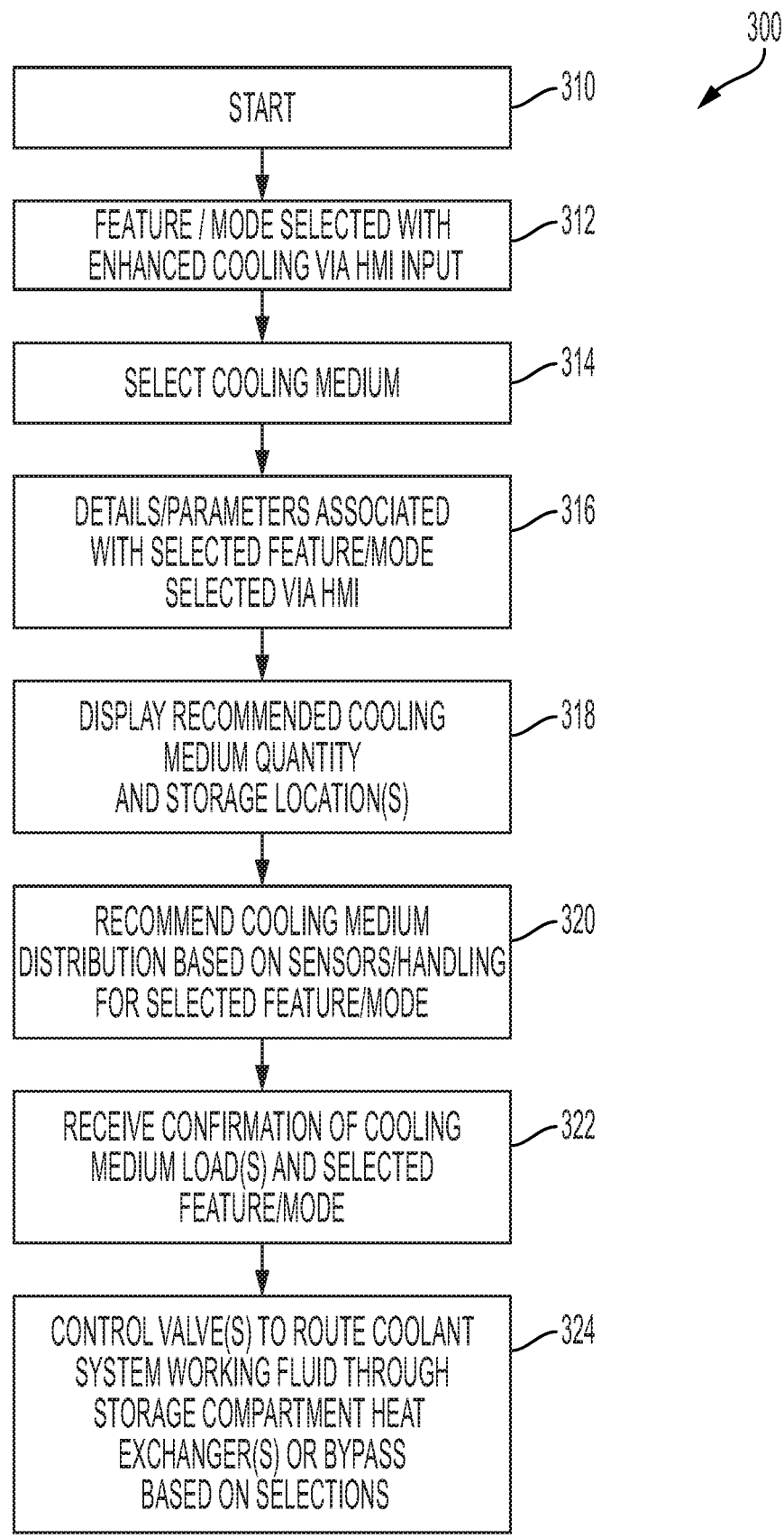
FIG. 3 is a flowchart illustrating operation of a system or method for controlling an electrified vehicle having a dual-use compartment configured to contain a cooling medium according to one or more embodiments.

FIG. 3 illustrates operation of a system or method for controlling an electrified vehicle to provide enhanced cooling using a cooling medium contained within a storage compartment having an associated heat exchanger coupled to the vehicle cooling system according to a representative embodiment. Control logic or functions performed by one or more controllers, modules, processors, etc. is generally represented in the diagram of FIG. 3. This illustration provides a representative control strategy, algorithm, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed. Similarly, the order of processing is not necessarily required to achieve the features and advantages of the claimed subject matter as described herein, but is provided for ease of illustration and description. The control logic may be implemented primarily in software executed by a microprocessor-based vehicle, engine, electric machine, and/or powertrain controllers, generally represented by system controller 148 of FIG. 1. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize solid state, electric, magnetic, and/or optical storage to keep executable instructions and associated calibration information, operating variables, and the like.

Representative control logic or algorithm 300 begins at block 310. A driver or other vehicle occupant selects a vehicle feature associated with a request for enhanced cooling as represented at 312. Representative features that may automatically request enhanced cooling system operation or provide an option to select enhanced cooling system operation may include a track mode, a fast charging mode, a towing mode, an extending trip mode, etc. Depending on the particular implementation, the driver may be prompted to select a cooling medium at 314 and provide additional details with respect to the selected mode at 316. Additional details may depend on the selected mode and include intended distance, charging parameters (maximum charge, charging rate, charging time), towing parameters (trailer weight or characteristics), etc. A recommended cooling medium type, loading quantity (volume or weight), and location(s) among one or more storage compartments may be recommended based on the additional details and/or ambient conditions including temperature, barometric pressure, humidity, etc. as represented at 318. Cooling medium weight distribution may also be recommended based on active suspension sensors or other ride and handling parameters for a particular selected feature or application as represented at 320. The driver accepts an HMI prompt for proceeding at 322 and the controller operates the associated valve(s) to control flow of the working fluid through the heat exchanger(s) associated with the storage compartments(s) and vehicle system requirements based on the state of the components in the cooling system as represented at 324. The control system logic may monitor temperatures of various vehicle system components of the cooling system based on signals from associated sensors and may override user selections from the HMI under some operating conditions. For example, when using ice as the cooling medium, the cooling capacity will change as the ice melts and the resulting water warms. The control logic may monitor associated temperatures and control the valve(s) accordingly to route the working fluid through, or bypass, the heat exchanger(s). Likewise, system temperatures indicate additional cooling is not recommended or needed, the valve(s) may be controlled to bypass the storage compartment(s) heat exchanger(s) even though additional cooling has been selected via the HMI.

As generally illustrated in the figures and described above, an electrified vehicle 100 includes an electric machine 160 configured to provide torque to vehicle wheels 170, 172. An energy store 124 is coupled to the electric machine 160 by associated power electronics 126. A vehicle body 200 defines a cargo compartment 156 configurable to contain a cooling medium. Vehicle 100 also includes a heat exchanger 158 disposed immediately below the cargo compartment 156 and configured to selectively exchange heat with the cargo compartment 156, a cooling system 152 configured to circulate a working fluid to exchange heat with at least one of the electric machine 160, the power electronics 126, and the energy store 124, and a valve 184 operable to selectively route the working fluid of the cooling system 152 through the heat exchanger 158 or to bypass the heat exchanger 158. Vehicle 100 further includes a controller 148 in communication with valve 184 and programmed to operate valve 184 in response to receiving user input from HMI 190 associated with a request for enhanced cooling, such as when a performance mode is activated. Controller 148 controls valve 184 to route the working fluid through the heat exchanger 158 when operating in the performance mode or similar mode, and to bypass the heat exchanger 158 otherwise. In one or more embodiments, controller 148 is programmed to control valve 184 to route the working fluid through the heat exchanger 158 in response to a temperature signal of at least one of the heat exchanger 158, the energy store 124, the electric machine 160, and the power electronics 126. Controller 148 may also control valve 184 to route the working fluid through the heat exchanger 158 in response to detecting of charging of energy store 124 through charge port 134 from an external power source 136.

As also illustrated and described with reference to the figures, a method for controlling an electrified vehicle 100 having a cooling system 152 configured to circulate a working fluid to cool at least one of an electric machine 160, a traction battery 124, and power electronics 126, and also including a cargo compartment 156 configurable to contain a cooling medium and having a heat exchanger 158 in contact with the cargo compartment 156, includes a controller 148 that controls operation of valve 184 to route the working fluid through the heat exchanger 158 to transfer heat from the working fluid to the cooling medium in response to a request for increased cooling. The method also includes controlling valve 184 to route the working fluid to bypass the heat exchanger otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information stored on various types of non-transitory storage media including information permanently stored on non-writable storage media such as ROM devices and information alterably stored on writeable storage media such as optical, magnetic, or solid state media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

While representative embodiments are described above, it is not intended that these embodiments describe all possible forms encompassed by the claims. The words used in the specification are words of description rather than limitation, and it is understood that various changes can be made without departing from the claimed subject matter. As previously described, the features of various representative embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not necessarily outside the scope of the disclosure or claimed subject matter and may be desirable for particular applications.

What is claimed is:

1. An electrified vehicle comprising:
   an electric machine configured to provide torque to vehicle wheels;
   an energy store coupled to the electric machine by associated power electronics;
   a vehicle body defining a cargo compartment configurable to contain a cooling medium;

a heat exchanger configured to selectively exchange heat with the cooling medium contained in the cargo compartment;

a cooling system configured to circulate a working fluid to exchange heat with the heat exchanger and at least one of the electric machine, the power electronics, and the energy store;

a valve operable to selectively route the working fluid of the cooling system through the heat exchanger or to bypass the heat exchanger;

a human-machine interface (HMI) configured to activate a performance mode in response to operator input; and a controller in communication with the valve, the controller programmed to control the valve to route the working fluid through the heat exchanger when operating in the performance mode.

2. The electrified vehicle of claim 1 wherein the controller is further programmed to operate the valve in response to receiving user input requesting enhanced cooling.

3. The electrified vehicle of claim 2 wherein the controller is further programmed to control the valve to route the working fluid through the heat exchanger in response to charging of the energy store from an external power source.

4. The electrified vehicle of claim 2 wherein the controller is further programmed to control the valve in response to temperature of at least one of the heat exchanger, the energy store, the electric machine, and the power electronics.

5. The electrified vehicle of claim 1 wherein the cargo compartment comprises a water-tight cargo compartment accessible by opening a hood of the vehicle.

6. An electrified vehicle comprising:

an electric machine configured to provide torque to vehicle wheels;

an energy store coupled to the electric machine by associated power electronics;

a vehicle body defining a cargo compartment configurable to contain a cooling medium;

a heat exchanger configured to selectively exchange heat with the cooling medium contained in the cargo compartment;

a cooling system configured to circulate a working fluid to exchange heat with the heat exchanger and at least one of the electric machine, the power electronics, and the energy store; and a valve operable to selectively route the working fluid of the cooling system through the heat exchanger or to bypass the heat exchanger, wherein the hood of the vehicle includes an integrated lid for the cargo compartment that provides a water-tight seal for the cargo compartment when the hood is closed.

7. The electrified vehicle of claim 5 wherein the cargo compartment comprises a plurality of baffles.

8. The electrified vehicle of claim 7 wherein the plurality of baffles comprises removable baffles.

9. The electrified vehicle of claim 1 wherein the heat exchanger comprises a cold plate forming a bottom surface of the cargo compartment.

10. The electrified vehicle of claim 1 wherein the energy store comprises a high-voltage traction battery.

11. A method for controlling an electrified vehicle having a cooling system configured to circulate a working fluid to cool at least one of an electric machine, a traction battery, and power electronics, the vehicle including a cargo compartment configurable to contain a cooling medium and having a heat exchanger in contact with, or within the cargo compartment, the method comprising, by a controller:

receiving input from a human-machine interface to activate a performance mode;

generating a request for increased cooling in response to activation of the performance mode; and controlling a valve to route the working fluid through the heat exchanger to transfer heat from the working fluid to the cooling medium in response to the request for increased cooling, and controlling the valve to route the working fluid to bypass the heat exchanger otherwise.

12. The method of claim 11 further comprising generating the request for increased cooling in response to connecting an external power source to charge the traction battery.

13. The method of claim 11 further comprising generating the request for increased cooling in response to temperature of the working fluid exceeding a corresponding temperature threshold.

* * * * *